US008826125B2

(12) United States Patent
Chu

(10) Patent No.: US 8,826,125 B2
(45) Date of Patent: Sep. 2, 2014

(54) SYSTEM AND METHOD FOR PROVIDING NEWS ARTICLES

(75) Inventor: Nelson Chu, New York, NY (US)

(73) Assignee: Hyperion Media LLC, East Brunswick, NJ (US)

(*) Notice: Subject to any disclaimer, the term of this patent is extended or adjusted under 35 U.S.C. 154(b) by 242 days.

(21) Appl. No.: 13/418,183

(22) Filed: Mar. 12, 2012

(65) Prior Publication Data

US 2013/0238989 A1    Sep. 12, 2013

(51) Int. Cl.
*G06F 3/048* (2013.01)
*G06F 17/30* (2006.01)

(52) U.S. Cl.
USPC ........... 715/273; 715/205; 715/234; 715/845; 707/602; 707/943

(58) Field of Classification Search
USPC ......... 715/200, 201, 203, 205, 234, 256, 273, 715/700, 715, 760, 762, 823, 825, 828, 715/845; 707/602, 758, 805, 913, 917, 943
See application file for complete search history.

(56) References Cited

U.S. PATENT DOCUMENTS

| | | | |
|---|---|---|---|
| 7,987,115 B2 * | 7/2011 | Shih et al. | 705/14.73 |
| 8,126,865 B1 * | 2/2012 | Bharat et al. | 707/706 |
| 8,209,616 B2 * | 6/2012 | Stefik et al. | 715/744 |
| 8,332,399 B1 * | 12/2012 | Osinga | 707/730 |
| 8,615,518 B2 * | 12/2013 | Khasnis et al. | 707/738 |
| 2006/0213976 A1 * | 9/2006 | Inakoshi et al. | 235/380 |
| 2006/0242158 A1 * | 10/2006 | Ursitti et al. | 707/10 |
| 2008/0092077 A1 * | 4/2008 | Mather et al. | 715/781 |
| 2009/0070346 A1 * | 3/2009 | Savona et al. | 707/100 |
| 2010/0125540 A1 * | 5/2010 | Stefik et al. | 706/12 |
| 2010/0191741 A1 * | 7/2010 | Stefik et al. | 707/748 |
| 2010/0191742 A1 * | 7/2010 | Stefik et al. | 707/748 |
| 2012/0259853 A1 * | 10/2012 | Khasnis et al. | 707/739 |

OTHER PUBLICATIONS

Tatar et al."Ranking news articles based on popularity prediction", IEEE Computer Society, 2012, pp. 106-110.*
Lin et al."Emotion Classification of Online News Articles from the Reader's Perspective", IEEE Computer Society, 2008, pp. 220-226.*
K. Lerman "Social Information Processing in News Aggregation", IEEE Computer Society, Nov. 2007, pp. 16-28.*

* cited by examiner

Primary Examiner — Maikhanh Nguyen

(57) ABSTRACT

A news reader is disclosed which selects the optimal articles for presentation to the user and which facilitates a sense of community among users. Upon receiving an article from a news provider, the news reader analyzes characteristics associated with the article. Amongst other things, the characteristics may indicate whether the article represents a breaking news story or whether the article includes advertisements. After analyzing the characteristics of the article, the news reader determines whether the article is to be designated a primary/presentable article and aggregates the article with other primary/presentable articles related to the same topic.

17 Claims, 9 Drawing Sheets

SYSTEM AND METHOD FOR PROVIDING NEWS ARTICLES

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The present invention relates to collecting and presenting news, and more particularly, it relates to providing a news reader which selects the optimal article for presentation to the user and which facilitates a sense of community among users.

2. Description of Related Art

A variety of different websites are available for presenting news articles to users over the Internet (e.g., websites provided by Associated Press™ CNN™, Reuters™ or Yahoo! News™). As known in the art, users can access these websites by connecting to the Internet and utilizing a web browser. When a user accesses the websites, the user may be presented with a variety of different news articles.

It is often the case that multiple articles are provided which describe a single topic or event. For example, when an event first occurs, a single news source (e.g., the Associated Press™) may initially break the story by publishing a small snippet (e.g., two or three sentences) that describes the event. Within a short while after the original snippet was published, a more detailed version of the story (e.g., a few paragraphs) may be published describing the event. Complete articles may be provided with full descriptions of the event over the course of the next few days, weeks or even months after the initial occurrence of an event.

As each article is published, the article tends to be copied by multiple news providers. For example, when Reuters™ publishes an article covering a topic or event, the article may be copied by secondary news providers (e.g., Yahoo! News™) that have entered into contracts or agreements with Reuters™ to allow for the reproduction and dissemination of the article. When the article is copied by the secondary news provider, the secondary news provider may insert advertisements into the article, or may supplement the article with additional facts or multimedia items (e.g., images or video).

The services offered by conventional news providers are inadequate for several reasons. When there are multiple articles covering a topic, conventional news providers do not provide an efficient mechanism for automatically identifying and selecting the best articles to be displayed to the user. As explained above, more detailed articles may be published over time after an event initially occurs. Conventional news providers do not have a mechanism that can analyze all of the articles covering a particular topic and select the best article to be displayed. In addition, the news providers often fail to account for the fact that many of the articles covering the topic are mere copies of other articles that have already been published.

Other deficiencies associated with the conventional news providers relate to the fact that conventional news providers fail to facilitate a social aspect or sense of community among users who access the website. These conventional news providers have no means of integrating with social networks. Furthermore, while certain news providers may permit users to post comments on articles or otherwise interact with the news provider's website, there is no mechanism to share the user's interactions with others (e.g., the user's friends, colleagues, co-workers, etc.).

SUMMARY OF THE INVENTION

In accordance with the present principles, a method is disclosed for presenting articles to a user on a news reader system. An article is received from a news provider, and the article is analyzed to identify the characteristics of the article. A determination is made as to whether the article is to be designated a primary article based on the characteristics associated with the article.

In accordance with the present principles, a system is disclosed for presenting articles to a user on a news reader system. The system includes a processor and a non-transitory computer readable storage medium that is configured to store a plurality of articles. The system also includes a news server that is configured to, receive an article from a news provider, identify characteristics associated with the article, and determine whether the article is to be designated a primary article based on the characteristics associated with the article.

Other objects and features of the present principles will become apparent from the following detailed description considered in conjunction with the accompanying drawings. It is to be understood, however, that the drawings are designed solely for purposes of illustration and not as a definition of the limits of the present principles, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar components throughout the views.

DETAILED DESCRIPTION

The disclosure herein generally relates to a cross-platform news reader that emphasizes aggregation and presentation of news articles, and which provides a number of social features that facilitate a sense of community among the users of the news reader. In a preferred embodiment, the news reader may be represent a website that is accessible to users over a network (e.g., the Internet, intranet, etc.).

Embodiments described herein may be entirely hardware, entirely software or may comprise a mixture of both hardware and software elements. Thus, while the description herein may describe certain embodiments, features or components as being implemented in software or hardware, it should be recognized that any embodiment, feature or component that is described in the figures or description of the present application may be implemented in hardware or software. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
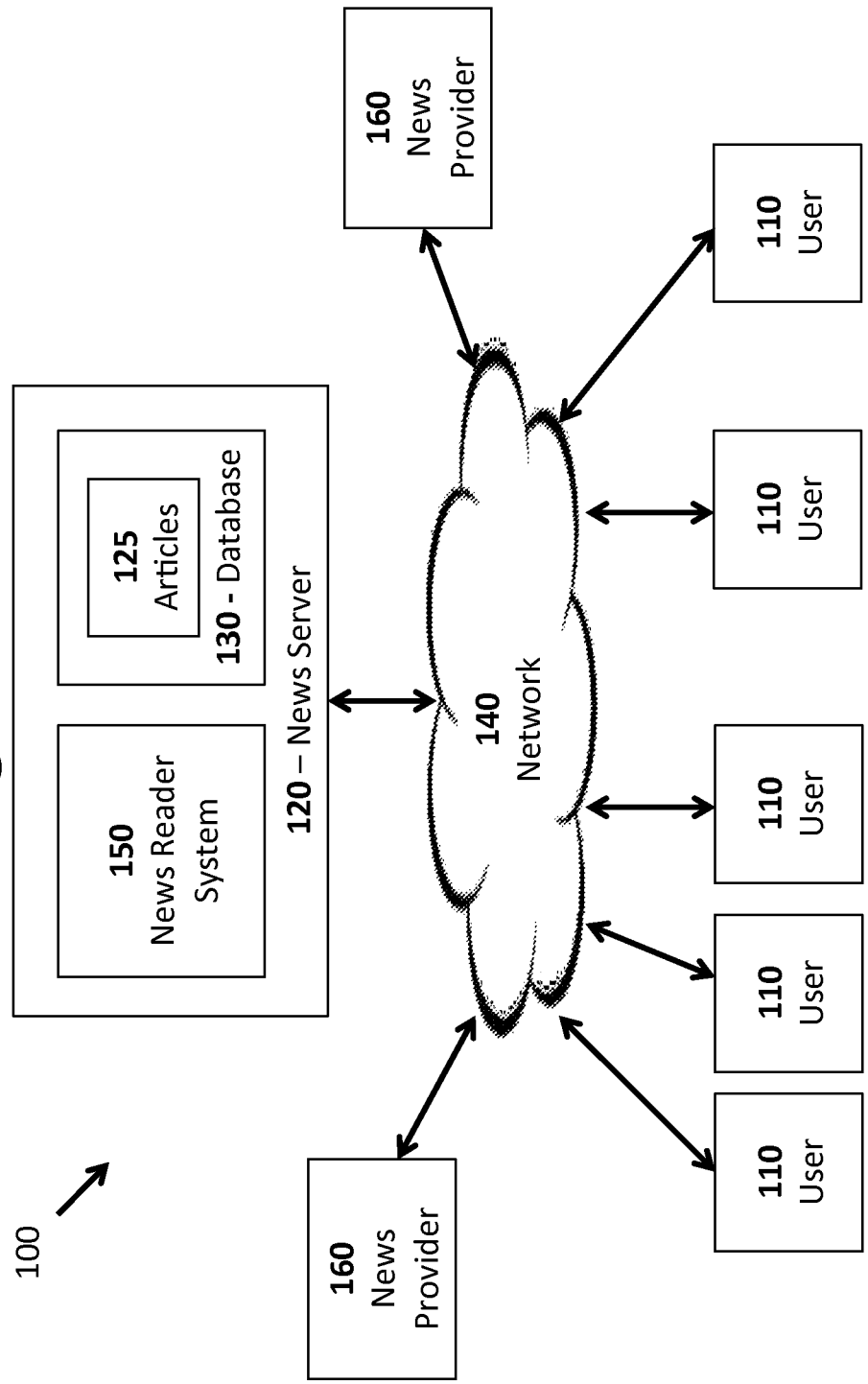
FIG. 1 is a system for presenting news to users over a network in accordance with one embodiment of the present principles.

Referring now to the drawings in which like numerals represent the same or similar elements and initially to FIG. 1, a system 100 is disclosed for presenting news articles 125 to users 110 over a network 140 in accordance with one embodiment of the present principles. As shown therein, a plurality of users 110 are in communication with a news server 120 over a network 140 (e.g., Internet, intranet, wide area network, local area network, etc.). The users 110 may connect to the news server 120 or network 140 using any type of wired or wireless connection in order to view articles 125 stored in the server database 130. Furthermore, the users 110 may connect to the server 120 or network 140 utilizing various types of computing devices (e.g., desktop computer, laptop, phone, personal digital assistant, tablet, mobile device, etc.)

The articles 125 stored on the server 130 may initially be retrieved from a plurality of article providers 160. The article providers 160 may also be connected to the network 140 or news server 120 utilizing any type of wired or wireless connection. The article providers 160 may represent established news companies (e.g., Associated Press™, CNN™, MSNBC™) websites, individual reporters, or other any other entity that contributes or otherwise provides news articles 125. In certain cases, the users 110 themselves may also represent article providers 160 (e.g., when the users contribute articles 125).

It should be recognized that the term "article" is used in a broad sense throughout this description. An "article" may generally refer to any type of information that describes a person, event or topic. Articles may be fiction or non-fiction, and may be comprise various types of multimedia content, such as text, images, animations, videos, audio, etc. Exemplary articles may include information obtained from a book, periodical, website, television show, or radio show. Furthermore, articles are not required to be a specific length. For example, an article may represent a single-sentence news snippet regarding a particular story, or may represent a lengthy dissertation about a particular topic (e.g., which may span hundreds of pages).

All of the articles 125 obtained by the news server 120 may be stored in a database 130. The database 130 may also store metadata information associated with the articles 125 (e.g., data which indicates how the article is classified, the author of the article, a list of users following the articles, etc.). The news reader system 150 is configured to present the articles 125 stored on the database 130 to the users, and to perform other operations related to providing articles to users 110 (e.g., classifying articles, uniquely tailoring the articles which are provided to specific users, interacting with social networks, etc.).

Figure 2:
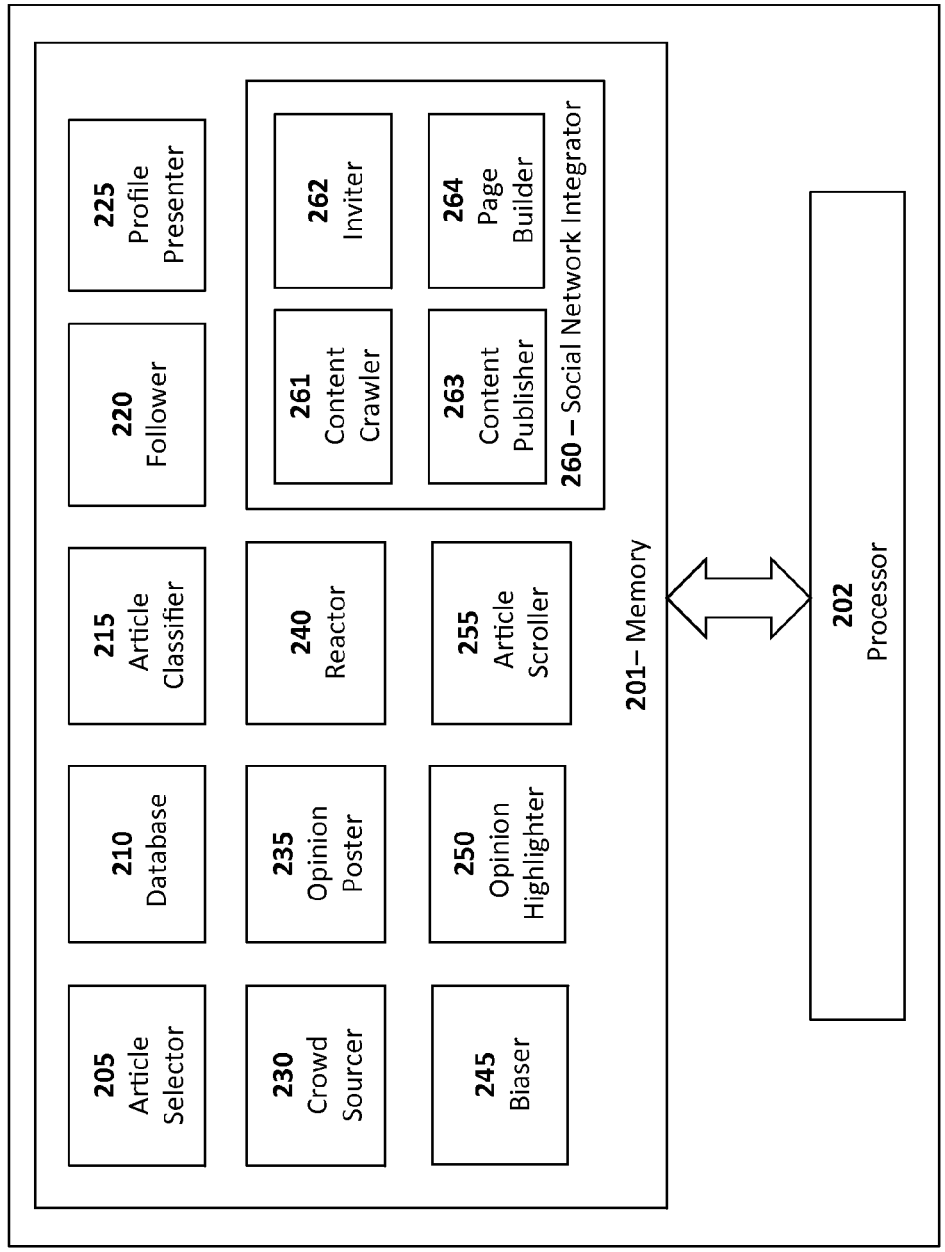
FIG. 2 is a news reader system in accordance with one embodiment of the present principles.

FIG. 2 discloses an embodiment of a news reader system 150 in accordance with one embodiment of the present principles. As shown therein, the news reader system 150 includes a processor 202 that is coupled to a memory 201 (e.g., RAM, ROM, hard disk, etc.) that stores a variety of different components. Although illustrated as individual, discrete components, alternative embodiment may exist wherein the illustrated components are integrated and/or distributed across multiple hardware devices and/or geographic areas. In certain embodiments, these components may be implemented as software modules (e.g., programs, methods or sub-routines). However, in other embodiments, the components are implemented as hardware components, and/or a combination of hardware and software components. In a preferred embodiment, the components comprising the news reader system 150 are implemented as software modules that are configured to present various functionalities and features on a website interface provided via a web browser (e.g., Internet Explorer™, Netscape Navigator™, Google Chrome™, etc.).

Figure 3:
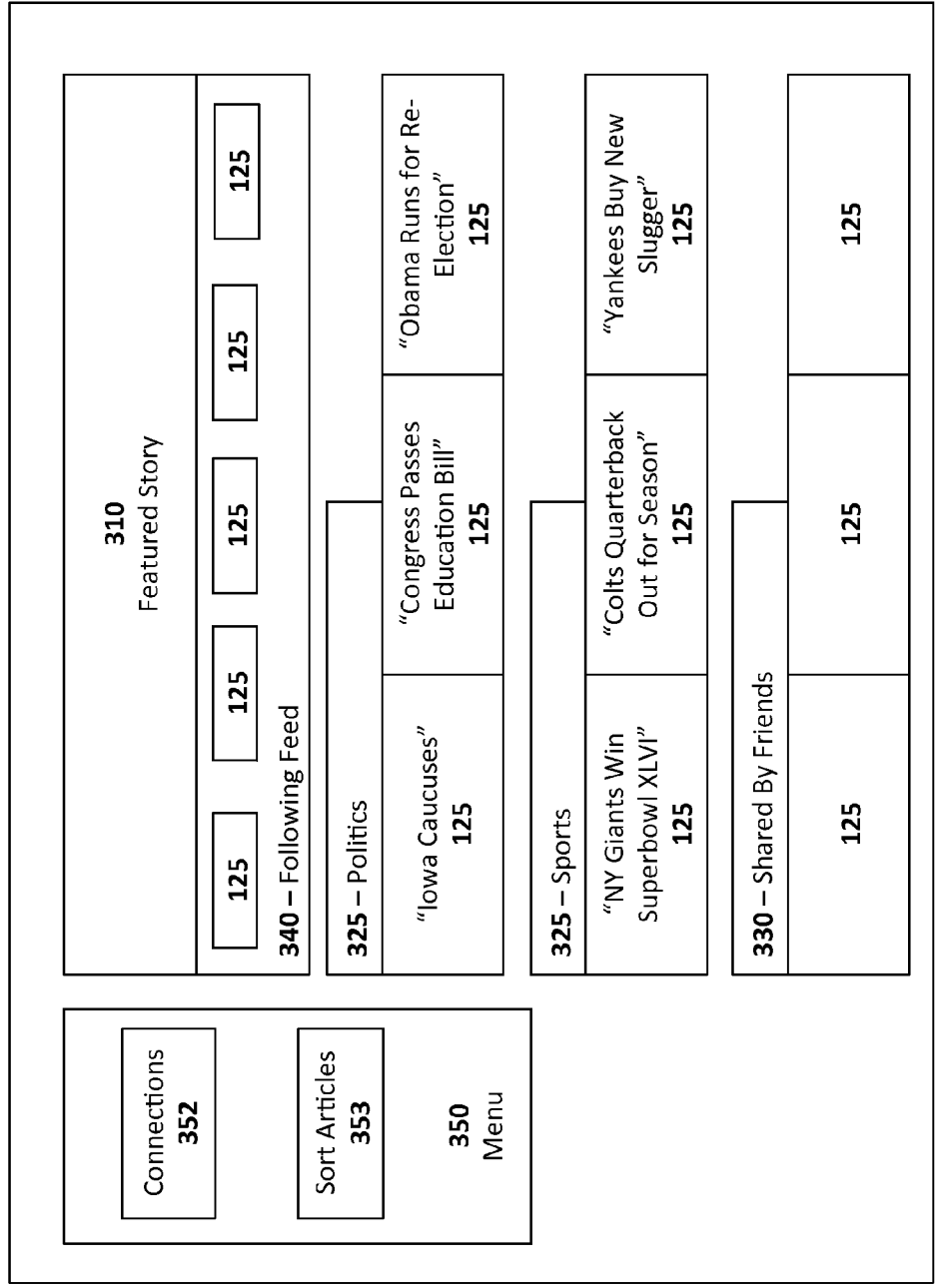
FIG. 3 is an illustration of an interface for presenting articles in accordance with one embodiment of the present principles.
Figure 4:
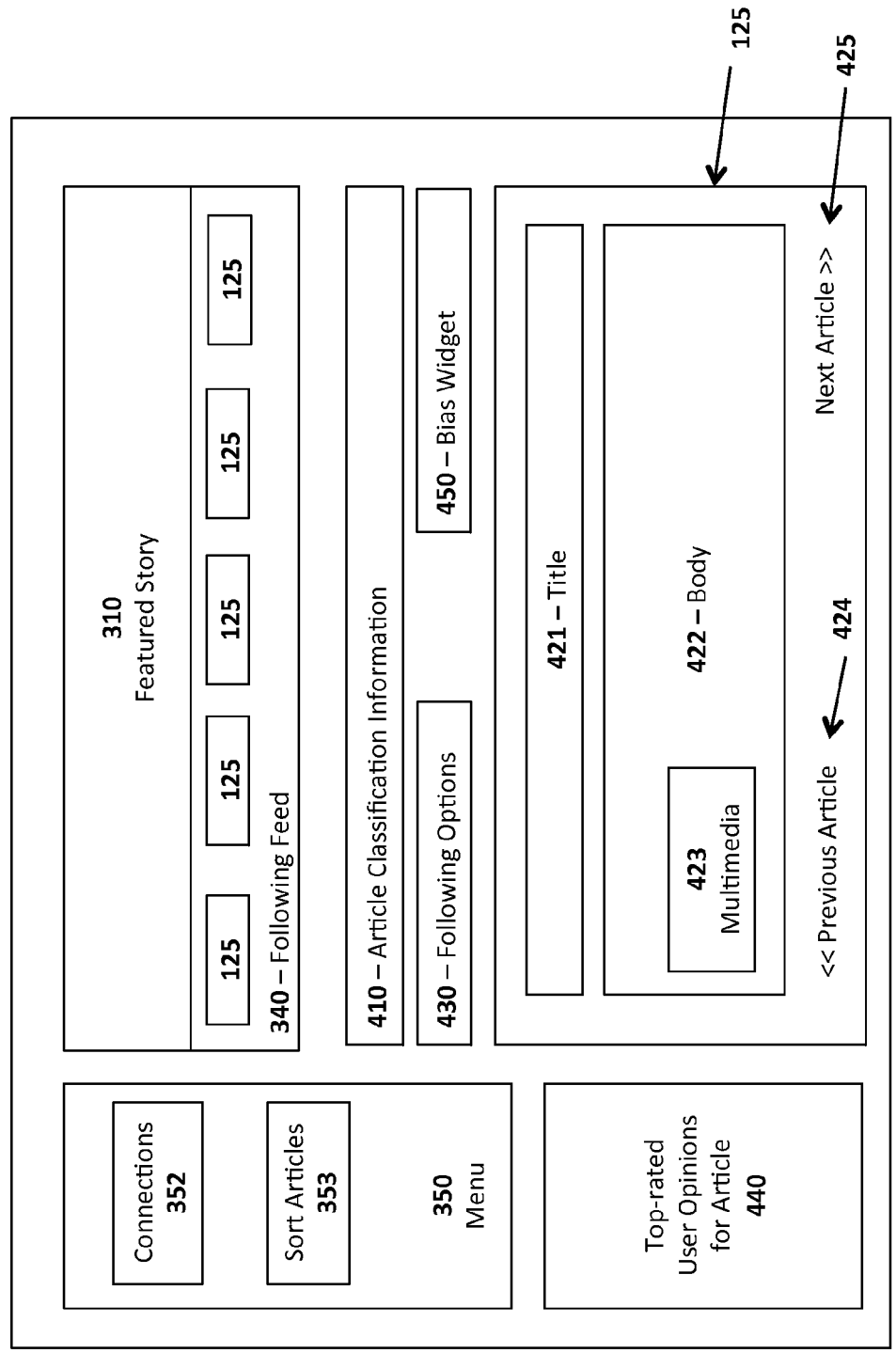
FIG. 4 is an illustration of an interface for presenting a selected article in accordance with one embodiment of the present principles.
Figure 5:
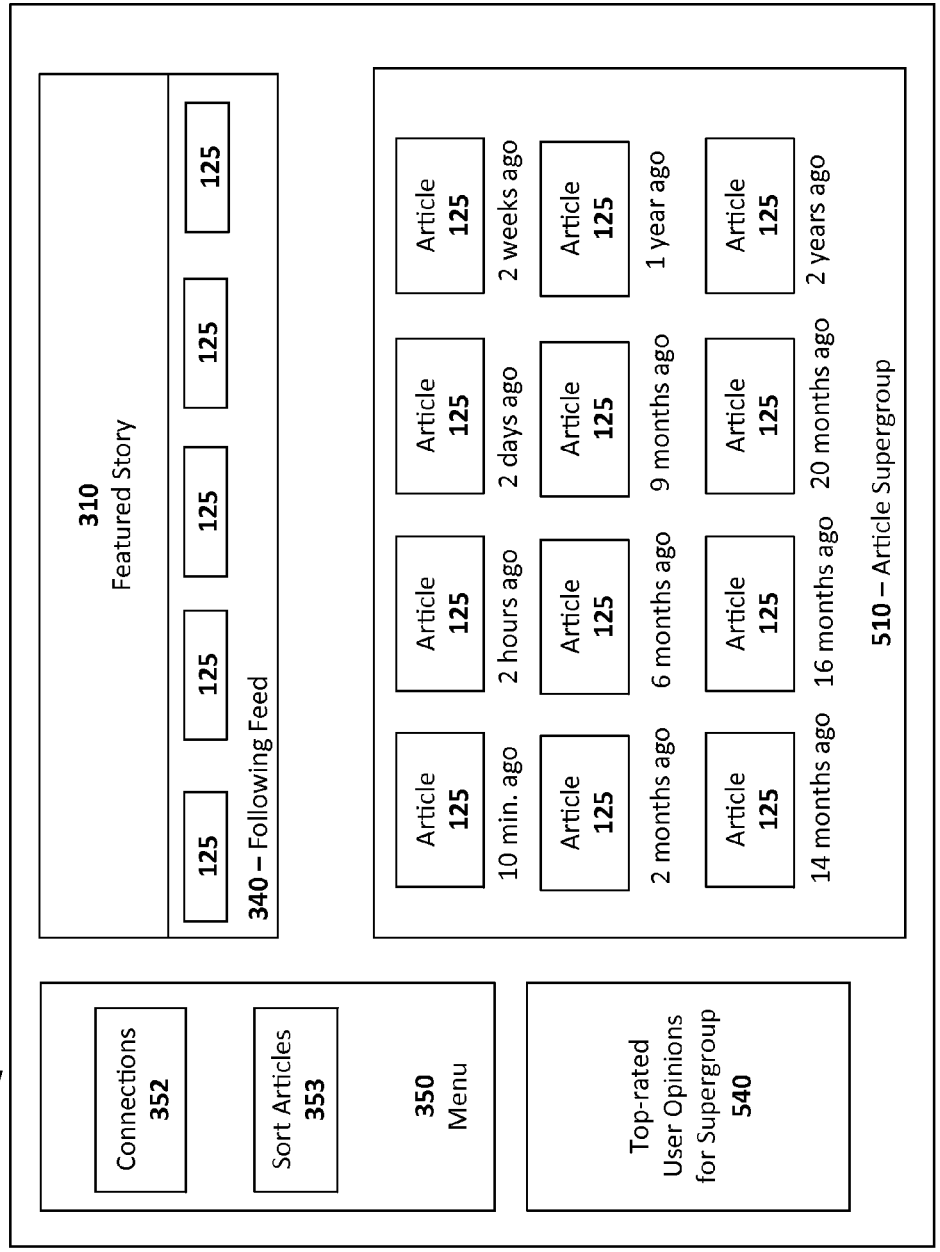
FIG. 5 is an illustration of an interface for presenting articles in a timeline in accordance with one embodiment of the present principles.
Figure 6:
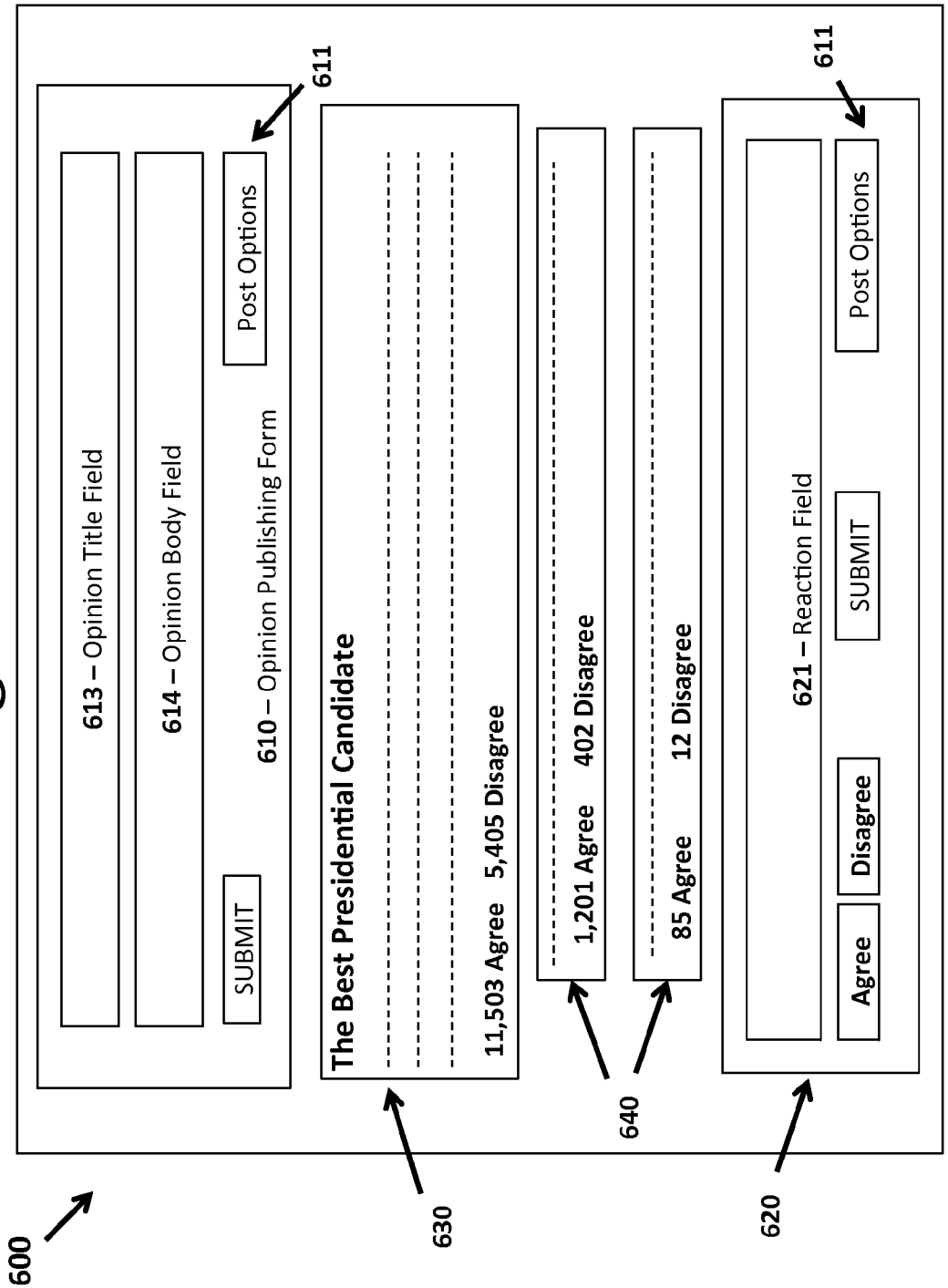
FIG. 6 is an illustration of an interface that permits users to post reactions and opinions in accordance with one embodiment of the present principles.

To demonstrate the functionalities provided by these components, reference will be made to the exemplary interfaces illustrated in FIGS. 3, 4, 5 and 6 throughout the description of FIG. 2. FIG. 3 illustrates, inter alia, an exemplary interface for demonstrating the manner in which articles 125 may be selected for presentation to a user. FIG. 4 illustrates, inter alia, an exemplary interface for presenting a selected article to a user. FIG. 5 illustrates, inter alia, an interface for presenting articles in a timeline. FIG. 6 illustrates, inter alia, an interface that permits users to post reactions and opinions.

The article selector 205 selects the articles 125 from the database 210 that are presented to users 110 when the users 110 access the server 120. When multiple articles 125 are provided for a particular topic or subject, the article selector 205 analyzes the characteristics of the articles 125 and selects the best article to present to users 110. As additional articles 125 are published about the topic over time, the article selector 205 may swap a first article that was previously deemed to be the best article available on a particular topic with a second article that is deemed to be better than the first article.

To further illustrate the role of the article selector 205, consider the exemplary interface 300 disclosed in FIG. 3. The interface 330 may represent the homepage for a news reader website. When a user 110 accesses the interface 300, a featured story 310 is displayed in the top, center portion of the interface 300. The interface 300 also includes a plurality of article categories 325 (e.g., sports, politics, technology, etc.).

For each article category 325, a listing of related articles 125 is provided. For example, an exemplary article category 325 may be provided to cover "Politics", and a list of politically-related articles 125 may provided including articles titled "Iowa Caucuses", "Congress Passes New Bill", "Obama Runs for Re-Election". Likewise, an exemplary article category 325 may be provided for "Sports", and may include a list of articles titled "NY Giants Win Superbowl XLVI", "Colts Quarterback Out for Season" and "Yankees Buy New Slugger". A user 110 can click on any of the articles (e.g., using a mouse pointing device or by tapping the screen of a touch screen device) listed on the interface 300, including the feature story 310, to access the associated the article 125. As discussed in further detail below, FIG. 4 illustrates an exemplary interface 400 for displaying an article 125 that has been clicked on or selected by a user 110.

For each of the articles 125 listed under an article category 325, there may be multiple articles 125 stored in the database 215 that describe the topic of the article 125. For example, there may be a dozen articles 125 describing the New York Giants™ victory in Superbowl XLVI. However, it would not be preferable for the user 110 to display all of the articles related to this topic under the Sports category 325 since the articles 125 all describe the same topic and since some of the articles 125 may even be identical to each other. Therefore, the article selector 205 may identify and select the single best article to be displayed to the user 110 for a particular topic. Thus, the article titled "NY Giants Win Superbowl XLVI" on the interface 300 represents the article 125 that was determined to be the best article 125 for the particular topic covering Superbowl XLVI. If a new article relating to Superbowl XLVI is published at a later time that is deemed to better, the interface 300 is updated and the new article will be displayed instead.

To choose the article 125 to present to a user 100 via the interface 300 in FIG. 3, the article selector 205 analyzes the characteristics of the articles, compares the article characteristics, and selects the best article 125 to select for presentation to the users 110. The article 125 selected as the best article for presentation to a user is referred to herein as the "primary article".

A variety of different article characteristics may be considered by the article selector 205 in selecting the primary article. For example, the article selector 205 may determine whether the article 125 is the first article to cover the topic (i.e., the breaking article), or whether the article 125 includes advertisements. The article selector 205 may also analyze the completeness of the article (e.g., whether the article is a snippet, a truncated article, or full text description of a topic), the quality of the article content, and whether the article 125 includes particular multimedia items (e.g., images, video, audio, animations, etc.). After examining all of the characteristics associated with the articles 125 covering a particular topic, the article selector 205 determines the best article 125 to display to the user 110.

Figure 7:
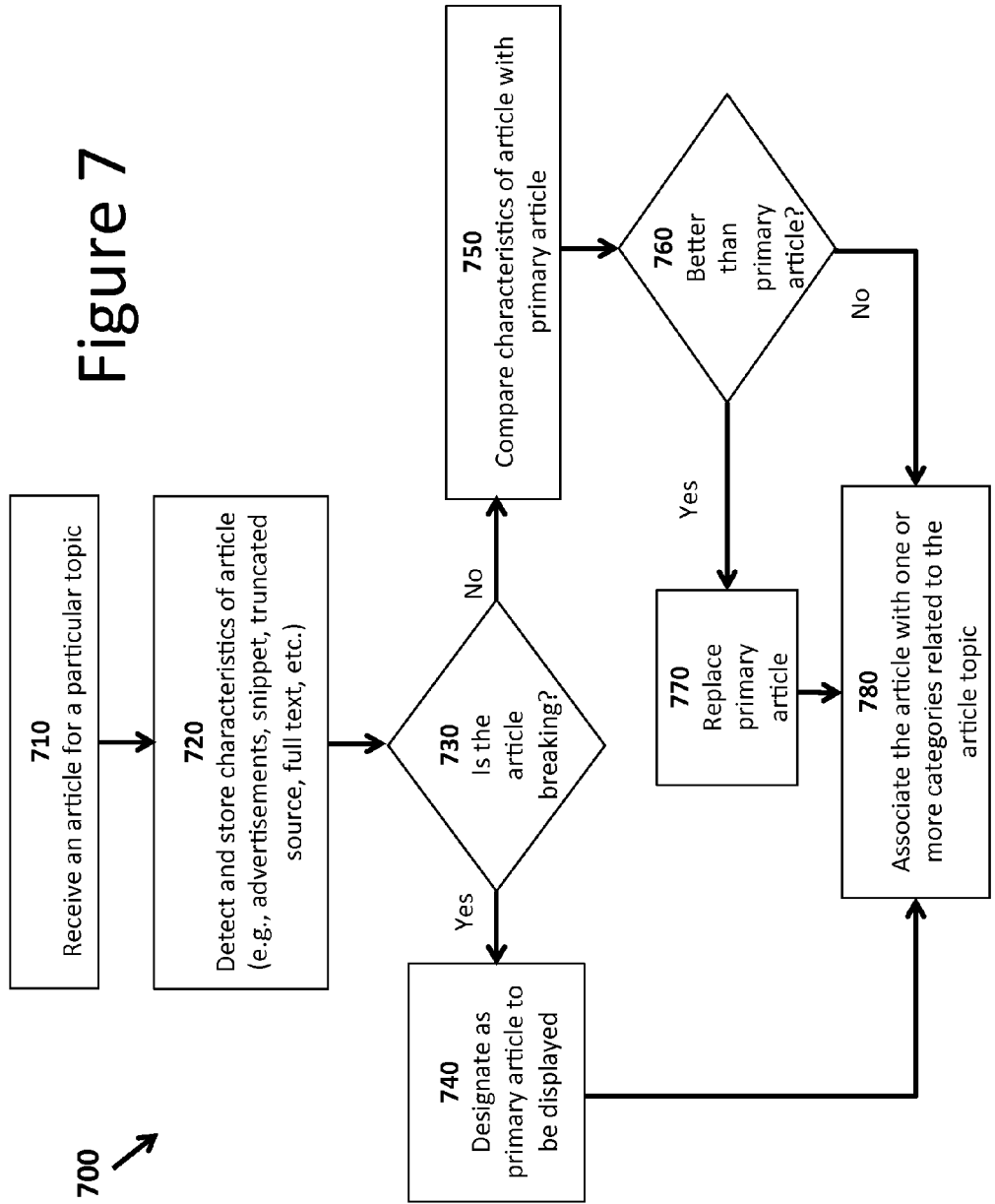
FIG. 7 is a method for selecting a story to be presented to a user in accordance with one embodiment of the present principles.

FIG. 7 discloses an exemplary method 700 for selecting an article 125 to be presented to a user 110 in accordance with one embodiment of the present principles. The method 700 set forth in FIG. 7 may be performed by the article selector 205 each time a new article is received for a topic.

The method 700 begins by receiving an article 125 for a particular topic (block 710). After receiving the article 125, the article 125 is examined to identify whether the article 125 includes particular characteristics (block 720). Identifying the characteristics of the article 125 may include: (1) determining the completeness of the article description (e.g., whether the article is a snippet, a truncated article or a full description article), (2) identifying whether the article is breaking; (3) detecting whether the article includes advertisements, (4) detecting whether the article includes particular multimedia items (e.g., photos, videos, audio, etc.), and (5) determining the quality of the article content (e.g., which may be indicated by analyzing the content of an article, how many users have expressed an interest in the article or how many users are following the article). The content of the article 125 may also be analyzed for additional characteristics as well (e.g., reliability of the source publishing the article, the date the article was published, etc.).

After analyzing the article 125, a set of feature indicators may be stored (e.g., in database 210) for each article 125 that indicate whether or not particular characteristics are applicable to the article 125. The feature indicators may be utilized by the news reader system 150 at a subsequent point for a variety of different reasons.

After the article has been analyzed, a determination is made as to whether the article is breaking (block 730). An article is "breaking" if the article 125 is the first article to be published on a particular topic, or if the article 125 is the first article that has been received by the news reader system 150 on a particular topic. To determine whether the article is breaking, the article selector 205 may analyze the contents of the database 210 to ascertain whether other articles 125 exist for the topic. If no other articles 215 exist for a particular topic, then a determination is made that the article 125 is breaking. Otherwise, if other articles related to the topic do exist within the database 210, then it may be determined that the article is not breaking. Other manners of determining whether an article is breaking may also be utilized (e.g., the a news provider 160 that is providing the article may identify the article as a breaking article).

If the article 125 is determined to be breaking, the article 125 is designated as the primary article (block 740). As explained above, an article 125 that has been designated as the "primary article" is the article 125 that will ultimately be chosen by the article selector 205 to be presented or displayed to users 110 (e.g., via an interface similar to the one presented in FIG. 3).

Each time a new article 125 is received by the news reader system 150, the article 125 may be organized into and associated with one or more topic groups regardless of whether the article 125 is selected as the primary article. Thus, after the article 125 is designated as the primary article 125 in block 740, the article 125 is associated with one or more categories (e.g., a supergroup or subgroup) related to the article topic 125. For example, an article 125 describing the results of the 2012 Iowa Caucuses for the U.S. Presidential Election may be associated with the supergroup "2012 Presidential Election" as well as the subgroup "Iowa Caucuses".

Further details regarding how articles 125 are associated with categories is discussed below in describing the article classifier 215 illustrated in FIG. 2.

If it is determined that the article is not breaking (e.g., other articles exist which cover the topic) in block 730, then the characteristics of the article 125 are compared with the characteristics of a previous article which was identified as the primary article (block 750). Based on this comparison, a determination is made as to whether the received article (i.e., the article received in block 710) is better or more optimal than the previous article 125 that was designated as the primary article (block 760).

Depending upon the particular situation, different characteristics may be utilized to determine whether the received article 125 should be designated as the primary article for presentation to users 110. For example, consider the situation in which two articles exist for a particular topic: a first article representing a small two-sentence snippet, and a second article representing a full description of the topic. In this situation, the article selector 205 may compare the characteristics (e.g., completeness of article description) associated with two articles 125. Based on this comparison, the article selector 205 may determine that the full description article 125 provides the best description of the topic and may designate the full description article as the primary article 125.

As a second example, consider a situation in which there are hundreds of articles covering a particular topic, many of which provide a full description of the topic. In this situation, analyzing the completeness of the article description (e.g., whether the article is a snippet, truncated article, or full description) may be insufficient by itself to determine whether a newly received article 125 should be designated as the primary article. Therefore, in this case, it may be preferable to consider additional characteristics, in order to select the primary article. For example, to select the best article, the article selector 205 may consider whether the articles 125 include advertisements or supplementary multimedia items that support the textual description of the article 125. In certain embodiments, the fact that an article 125 includes an advertisement weighs against the article 125 being designated as the primary article 125, while the presence of supplementary multimedia items within the article content weighs in favor of selecting the article 125 as the primary article 205.

Other factors may also be analyzed to determine whether the received article 125 is better than the article 125 that is currently designated as the primary article. For example, the article selector 205 may also consider the date that the article was published, the reliability or reputation of the source providing the article, the number of users which have explicitly expressed an interest for an item (e.g., the number of users which have indicated that they "Liked" the article 125 on Facebook™), the number of users which have viewed a particular article 125, the number of users which have commented or posted an opinion on a particular article, the number of users which are following an author of the article, etc.

Regardless of which characteristics are considered, a determination is made as to whether the received article 125 is better than a previous article 125 that is currently designated as the primary article (block 760). In the case that the received article is determined to be more preferable, the received article 125 will replace the previous article and become the new primary article (block 770). However, if the received article 125 is not deemed to be better than the previously selected primary article 125, the received article is not designated as the primary article. In either case, the received article 125 is thereafter associated with one or more categories related to the topic of the article 125 (block 780), and the method 700 terminates.

The manner in which the article classifier 215 assigns or associates an article with a category may initially involve identifying the "topic" of an article 125. The topic of an article may relate to a person, place or event associated with the article 125 or discussed within the article 125. In certain embodiments, this may be performed directly by a human person (e.g., by a user, website administrator or employee of the news reader system). In other embodiments, this may be performed automatically by the news reader system 150.

To identify the topic of an article 125, the news reader system 150 may analyze various characteristics of the article 125. For example, the news reader system 150 may search for keywords or terms within the text of an article 125 (e.g., text found in the title, body, caption or other portion of the article 125). In addition, the source of an article 125 or metadata provided with the article 125 may also be examined to identify the topic of the article 125.

The news reader system 150 may further analyze multimedia elements associated with an article to identify a topic of the article 125. For example, voice or audio recognition software may be utilized to analyze video or audio segments associated with an article 125, or facial or object recognition software may be applied to identify a person, place or object that appears within images, videos, or animations that are included in the article 125.

After identifying the characteristics of an article 125, the identified characteristics may be utilized to identify the topic of the article 125. The various characteristics may be weighted differently in making this determination. For example, the presence of a keyword in the title of an article may provide a better indicator of the topic that the presence of a keyword in the caption of a picture associated with the article.

After the topic of an article 125 has been identified, the article classifier 215 may determine how to categorize the article in a hierarchal classification structure that includes a supergroup and one or more subgroups. The supergroup represents the broadest level of classification for an article, while a subgroup represents a subset of a supergroup or another subgroup.

For example, a supergroup may be provided for the topic "Football". Within the supergroup of "Football", subgroupes may exist for "NFL Football" and "Arena Football" representing a second level of the hierarchy. Within the subgroup "NFL Football", there may be even further subgroupes (e.g., "NY Jets", "Superbowl XLVI" and "Aaron Rodgers Wins 2011 MVP"). In the case that an article 125 is provided whose topic is related to the NY Giants win in Superbowl XLVI, the article 125 may be associated with the supergroup "Football" and the subgroupes "NFL Football" and "Superbowl XLVI". Classification indicators or metadata may be stored in a database 210 with the article 125 to associate an article 125 with one or more supergroups or subgroups.

The article classifier 215 may also be configured to track or organize articles in a supergroup or subgroup in terms of a timeline. For example, each time an article is received for a particular topic, the time and date that an article 125 is published or received by the news reader may be recorded in a database 210 with the article 125 and its metadata. By associating the time and date with the article 125, a user 100 is permitted to scroll through all articles 125 relating to a particular topic in chronological order, thus allowing the user 110 see the particular manner in which a story has evolved from the initial breaking of the story to the present time. FIG.

4 and FIG. 5 illustrate two exemplary ways in which a user can scroll through articles in chronological order.

As explained above, the interface 400 disclosed in FIG. 4 may be displayed in response to a user selecting a particular article 125. As shown therein, the interface 400 displays the article 125 selected by the user 100, including a title 421, body 422 (e.g., text), and one or more multimedia items 423 (e.g., images, videos, audio clips, etc.) associated with the article 125. Article classification information 410 is displayed above the article 125. The article classification information 410 indicates the supergroups and/or subgroups that the article classifier 215 has associated with the article 125.

The interface 400 in FIG. 4 also discloses a "next article" button 424 and a "previous article" button 425 that permit a user 110 to navigate to another article 125 within the same supergroup. As explained above, articles 125 are grouped into a supergroup may be tracked or organized by the article classifier 215 in terms of a timeline by recording the date and time when the article 125 was published or received by the news reader system 150. When the user 110 selects the next article 424 button, the user 100 navigates to the next article in the timeline for the supergroup (i.e., the article 125 in the supergroup that was published immediately after the selected article 125 that is displayed in FIG. 4). Similarly, if the user 110 selects the previous article button 425, the user 110 navigates to the previous article 125 in the timeline for the supergroup (i.e., the article 125 in the supergroup that was published immediately prior to the selected article 125).

FIG. 5 discloses an exemplary interface 500 for presenting all articles of a supergroup 510 in chronological order. It should be noted that a similar interface 500 may be utilized to present the articles 125 of a particular subgroup as well. It should also be noted that the manner in which the timeline is presented may be varied in other embodiments.

As shown therein, a plurality of articles 125 associated with a particular supergroup 510 may be displayed along with chronological information (i.e., 10 minutes ago, 2 days ago, 2 years ago, etc.) that indicates the date and/or time when the article 125 was initially published or received by the news reader system 150. By providing the articles 125 to the user in such a timeline, the user 110 can see how a story or topic associated with the supergroup 510 has evolved over time. For example, the user 110 can read about how the article 125 was initially broke or revealed by selecting the first story (i.e., the article 125 that was published 2 years), or the user 110 can select the most recent article 125 (i.e., which was published 10 minutes ago) to read about recent updates associated with the topic. Presenting the articles 125 in this manner permits a user 110 to quickly and efficiently review all articles 125 published on a particular topic.

Quick and efficient review of articles 125 is also facilitated by the role of the scroller 255. The article scroller 255 may be configured to permit a user 110 to scroll through and read an entire article 125 when the user 110 has placed a cursor or pointer over an article 125. Thus, the user 110 is not required to click on a particular article 125 to view or read the contents of the article 125.

To illustrate the functionality of the scroller 255, consider the interface 300 in FIG. 3 once again. The interface 300 includes a plurality of articles 125 organized into different groupings. The scroller 255 may be configured to detect when a user 110 places a cursor over one of the articles (or when a user places his or her finger on one of the articles 125 in the case of a touch screen), e.g., by detecting an "on MouseOver" event in Javascript. When the scroller 255 detects such a placement of the cursor (or finger), the scroller 255 may reconfigure or otherwise cause the article 125 to become scrollable. When the article 125 becomes scrollable, the user can scroll through the entirety of the article (e.g., using the trackwheel on a mouse or with the user's finger on a touch screen device) without having to load a new webpage. The article 255 returns to a static state and is no longer scrollable when the cursor or finger is no longer hovering over the article 125.

By making each of the articles 125 a separate, scrollable pane that can display an entire article to a user 110, the interface is able to present dozens of articles to the user 110 without crowding the interface 300 with an excessive amount of content and without requiring the user to reload the page. This may be particularly advantageous in cases where the user 110 is browsing or skimming a plurality of articles 125, or when the user 110 has limited Internet connectivity (since the user will not have to load an entirely new web page to view an article).

Moving on, the system 200 disclosed in FIG. 2 also includes a follower 200. The follower 220 assists in developing a sense of community among the users 110 by permitting a user 110 to "follow" articles 125 or content associated with particular topics, article providers 160, authors or other users 110. A user 110 may wish to receive articles 125 on a particular topic (e.g., articles associated with a particular supergroup or subgroup), articles 125 that are published by a particular news provider 160, articles 125 published by a particular author, or content posted by another user 110 (e.g., an opinion or reaction posted by another user). In order to do this, the follower 220 permits a user 110 to specify the articles 125 or content that the user is interested in following (e.g., by providing a button or input form which the user 110 may interact with). Based on the interests specified by the user 110, the follower 220 retrieves relevant articles 125 of interest and presents the articles 125 to the user in a special news feed comprising followed articles 125.

FIGS. 3, 4 and 5 illustrate an exemplary following feed 340 for presenting articles 126 that are being followed by a user 110. The following feed 340 is configured to analyze the user's 110 following preferences and present the user 110 with all articles 125 related to the topics, article providers 160, authors, or users 110 that the user has chosen to follow. A user 110 can sort the articles 125 presented on the news feed 340 in various ways (e.g., chronological order, topic, mostly likely to interest the user, etc.) by selecting the sort articles option 353 (which may represent a drop-down input form) located on the menu 350.

A user 110 may follow a particular topic at different granularities by selecting supergroups or subgroups that are of interest to the user 110. For example, a user 110 interested in the 2012 presidential election may opt to follow the supergroup "2012 Presidential Election". In this case, the follower 220 will retrieve newly published articles 125 that are relevant to 2012 presidential election and display the articles 125 or related link in the following feed 340.

However, in certain cases, the user 110 may only be interested in following a subgroup associated with a particular topic. For example, rather than receiving all articles 125 associated with the 2012 presidential election, a user 110 may only wish to receive articles 125 that are related to the Iowa caucuses. Thus, rather than following the entire supergroup for the 2012 presidential election, a user 110 may choose to follow the subgroup "Iowa Caucuses". In this case, the user 110 will only receive articles 125 relating to the 2012 presidential election that pertain to the Iowa caucuses.

In other cases, a user 110 may be interested in following articles posted by a particular news provider 160 or author. If the user 110 has indicated such a preference, the follower 220 will retrieve a newly published article 125 that that has been published by the news provider 160 or author and display the article 125 or related link in the following feed 340.

Similarly, a user may be interested in opinions, reactions, or other content that is posted or provided by another user 110 of the news reader system 150. Thus, each time a followed user posts an opinion, reaction or otherwise provides content to the news reader system 150, a related entry appears in the following feed 340.

A sense of community is developed thru followers and following, where a user 110 can select anyone to follow and receive their stream without being followed back. In certain embodiments, if two users follow each other, then a "following connection" is formed between the two users. When a following connection is formed between two users, a user 110 that is a member of the following connection receives certain content (e.g., opinions, reactions or highlighted opinions) that is posted by the other member of the following connection. Specifically, a user 110 that is a member of following connection shares content (e.g., articles, opinions, reactions, or highlighted opinions) with the other user 110 that is part of the following connection if the content is published in a category that is followed by both users 110. A user 110 may click on the connections button 352 located in a menu 350 on an interface to view the user's connections and the content posted by the user's connections.

For example, suppose that two users 100 form a following connection, and the first user follows the category groups (e.g., supergroups or subgroups) related to politics, technology and fashion, while the second user 110 follows category groups for politics, technology and food. If either one of the users comment on an article 125 (e.g., by posting an opinion, reaction or highlighted opinion) related to politics and technology, the comment posted by the user 110 appears in the following feed 340 of the other user 110. However, if the first user posted a comment on an article 125 related fashion, the comment would not appear in the following feed 340 since this is not a category group shared by the users 110.

The exemplary interface 400 in FIG. 4 illustrates a feature that permits a user to specify following options 430. As explained above, the interface 400 represents an exemplary web page that may be presented to a user 110 after a user has selected an article 125 to read (e.g., after the user clicks on an article 125 listed on the interface 300 in FIG. 3). Above the selected article 125, a set of following options 430 is provided to the user 100. The following options 430 may represent input buttons (e.g., checkboxes or radio buttons) that permit the user 110 to follow the supergroup associated with the article 125, one or more subgroupes associated with the article 125, an author of the article 125, or a news provider 160 (e.g., Associated Press™) that provided the article 125.

A user can specify articles 125 or content to follow in other ways ways. For example, after a user 110 enters login credentials (e.g., by entering a username and password), the profile presenter 225 may present the user's profile for display to the user 110. Once the user 110 accesses their profile, the user 110 may be presented with an input form or other interface that permits the user 110 to search and select articles, content, people, or topics to follow.

The opinion poster 235 and reactor 240 serve to further facilitate a sense of community among users 110. The opinion poster 235 permits a user to post an opinion or article 125 on the news reader system 150. After a user 110 posts an opinion, the reactor 240 is configured to provide users 110 of the news reader system 150 with a unique commenting system in which users 110 are encouraged to post "reactions" on opinions posted by other users on particular topics or articles 125.

The reactor 240 also permits users to post reactions to other reactions that have been posted.

In certain embodiments, when a user 110 posts a reaction, the user may be required to provide or select a positive or negative indicator that represents the user's viewpoint towards the content which is the subject of the reaction. For example, in one embodiment, the user may be required to indicate whether he or she agrees or disagrees with the viewpoint of the opinion or reaction that is user 110 is commenting on. Other types of positive and negative indicators may be utilized as well.

To illustrate the functionality of the opinion poster 235 and reactor 240, consider the exemplary interface 600 disclosed in FIG. 6. As shown therein, the interface 600 discloses an exemplary opinion 630 posted by a user 110. The opinion 630 includes a title (i.e., "The Best Presidential Candidate") and a textual description (represented by the dotted lines) describing the user's 110 opinion on a topic. User preference indicators indicate the number of users 110 that have posted a positive reaction (i.e., 11,503 reactions agreeing with the opinion) and negative reaction (i.e., 5,405 reactions disagreeing with the opinion).

An opinion publishing form 610 permits a user 110 to post an opinion 630. In certain embodiments, an opinion publishing form 610 comprises an opinion title field 613 and an opinion body field 614 that permit a user to enter a textual title and body for the article. In certain embodiments, the form 610 may also permit a user 110 to upload and include multimedia items in the opinion 630. After a user 110 fills out the opinion title field 613 and opinion body field 614 on the opinion publishing form 610, the user 110 may hit the submit button to post the opinion on the news reader system 150. Opinions 630 posted on the news reader system 150 are saved in a database 210 with associated metadata (e.g., time the opinion was posted, author of the opinion, etc.), and the opinion 630 is made available on the news reader system 150 for other users 110 to view.

In certain embodiments, the news reader system 150 may display a list of the most popular opinions relating to a particular article 125, supergroup or subgroup. For example, the interface 400 in FIG. 4 illustrates a list of top-rated opinions 440 posted by users that are applicable to the particular article 125 that is being displayed. Similarly, the interface 500 in FIG. 5 discloses a list of top-rated opinions 540 posted by users 110 that are applicable to the supergroup that is being displayed.

Below the opinion 630, two exemplary reactions 640 are displayed (with the textual description represented by the dotted lines). The reactions 640 represent comments that have been posted by other users 110 on the opinion 630. As explained above, in certain embodiments, the user 110 must specify a positive or negative preference indicating whether the user agrees or disagrees with the opinion before posting a reaction 640.

A user 110 may also post a reaction 640 on another reaction 640 that has been posted by another user 110. For each reaction 640 disclosed in FIG. 6, user preference indicators display the number of users 110 that have posted a positive reaction agreeing with the reaction (i.e., 1,201 reactions agreeing with the top-most reaction) and a negative reaction disagreeing with the reaction (i.e., 402 reactions agreeing with the top-most reaction).

The interface 600 also discloses a reaction publishing form 620 that permits a user 110 to post a reaction 640 on an opinion 630 or other reaction 640. The form includes buttons that permit a user to indicate whether the user agrees or disagrees with an opinion 630 or reaction 640. The reaction publishing form 620 also includes a reaction field 621 that permits a user to enter a textual description for the reaction 640. In certain embodiments, the form 620 may also permit users to upload and include multimedia items with the reaction 640. After the user 110 fills out the reaction publishing form 620, the user 110 may hit the submit button to post the reaction 640 to the news reader system 150. After a user 110 posts a reaction to the news reader system 150, the reaction 640 may be saved in a database 210 with associated metadata (e.g., date the reaction was posted, the user that posted the reaction, etc.) and may be displayed to other users 110 who have selected the opinion 630 for viewing.

Like the reactor 240, the opinion highlighter 250 permits users 110 to specify whether the user 110 agrees or disagrees with particular issues or topics (or otherwise specify a positive or negative preference). However, with the opinion highlighter 250, the user 110 is not required to indicate whether he or she agrees or disagrees with the stance taken by an entire opinion, reaction, article, etc. Rather, the opinion highlighter 250 permits the user 110 to specify whether the user 110 agrees or disagrees with a subset of an article, opinion, reaction, or other text displayed on the news reader system 150.

In order to indicate the user's preference on a particular portion of text, a user 110 may post a "highlighted opinion". To post a highlighted opinion, the opinion highlighter 250 provides the user 110 with the ability to select a portion of text (e.g., in an article, opinion, reaction, etc.). For example, a user 110 may select a portion of text (e.g., a sentence or paragraph) by clicking and dragging the cursor or by highlighting text on a touch screen device. When the user 110 highlights the selected portion of text, an input button or form may automatically be displayed that permits the user 110 to select "AGREE" or "DISAGREE". In some cases, the AGREE and DISAGREE buttons may be presented to a user on a menu after the user highlights the text and performs a right-click on a mouse (or a similar secondary clicking operation on a touch screen device). The user 110 can click one of the buttons to indicate the user's preference. In certain embodiments, an interface may be provided that displays all of the user's opinions.

Figure 8:
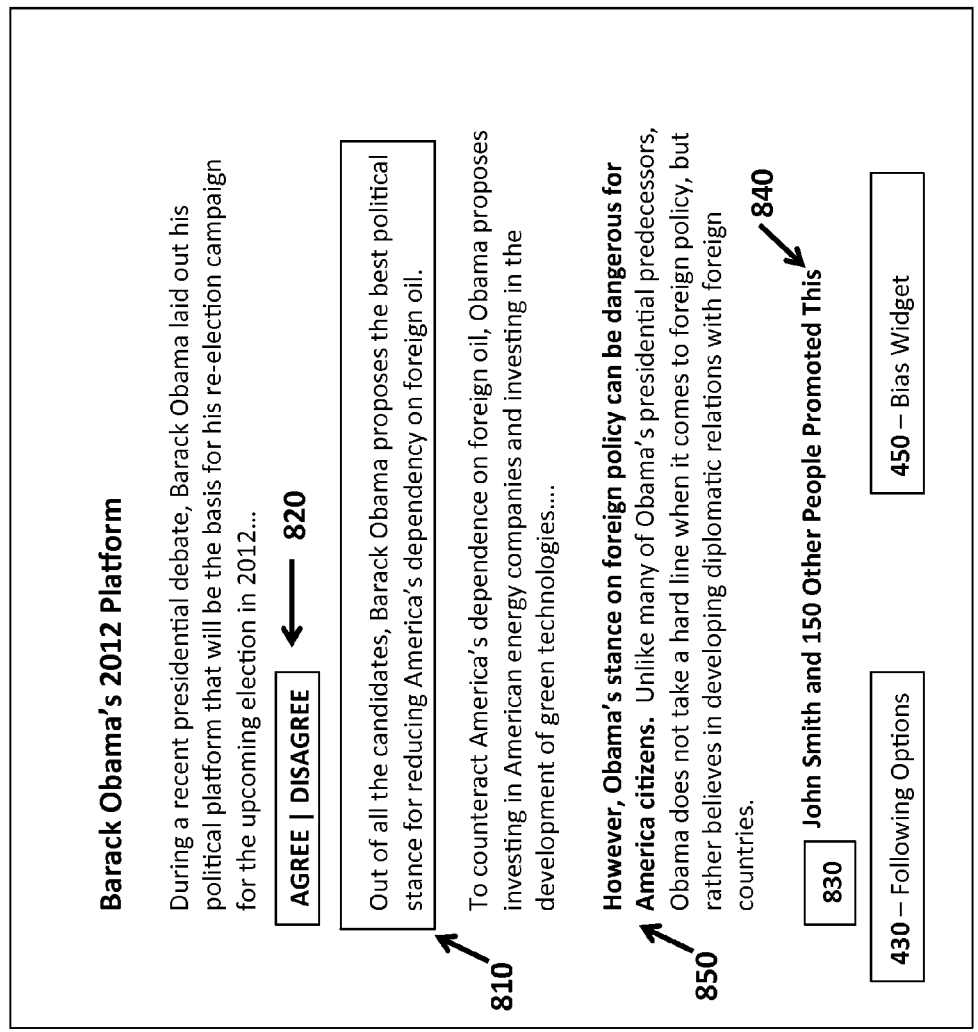
FIG. 8 is an illustration of an exemplary opinion that demonstrates how a user can post a highlighted opinion in accordance with one embodiment of the present principles.

Consider the exemplary opinion 630 depicted in FIG. 8 in order to illustrate the manner in which a user may post a highlighted opinion. The opinion 630 is titled "Barack Obama's 2012 Platform". The opinion 630 describes the political platform of Barack Obama for the 2012 presidential election.

As explained above, a user 110 may select a subset of the opinion to express and indicate whether the user 110 agrees or disagrees with the selected subset. For example, supposed a user 110 selects the text in block 810 (e.g., by highlighting the text with a mouse or by highlighting the text with a finger on a touch screen device). Once the user 110 selects the text, a preference indicator 820 automatically appears and presents the user 110 with two options: AGREE or DISAGREE. The user 110 can click on or select one of the options to indicate the user's stance with respect to the selected portion of text.

Staying with the above example in FIG. 8, the user 110 may select the "DISAGREE" option if the user 110 disagrees with the statement: "Out of all the candidates, Barack Obama proposes the best political stance for reducing America's dependency on foreign oil.". As the user reads the opinion, the user may post additional highlighted opinions as well. For example, the user may which to indicate his or her stance on the statement: "However, Obama's stance on foreign policy can be dangerous for America citizens." In order to do so, the user 110 would once again highlight the applicable portion of text in the opinion 630, and select the "AGREE" or "DISAGREE" option when the preference indicator 820 appears.

It should be noted that while FIG. 8 discloses an exemplary opinion 630, users 110 can post highlighted opinions for any type of textual content displayed on a news reader system, including but not limited to text recited in articles or reactions. In addition, in certain embodiments, the user 110 may also be permitted to post highlighted opinions on multimedia items (e.g., videos and images) or captions associated with multimedia items. Furthermore, it should also be recognized that other types of positive or negative indicators (e.g., YES/NO, Like/Dislike, etc.) may be utilized to specify a user preference rather than the AGREE/DISAGREE indicators.

In certain embodiments, some or all of the user's highlighted opinions are posted and made available on an interface provided by the news reader system 150. For example, as discussed in further detail below, the user may include a public profile page that can be viewed by other users 110, and the public profile page may indicate various different ways in which a user has interacted with a news reader system 150 (e.g., opinions posted by the user, highlighted opinions posted by the user, articles or topics being followed by the user, etc.).

The opinion highlighter 250 may communicate with the crowd sourcer 230 to emphasize the important aspects of content such as articles, opinions or reactions. As users 110 post highlighted opinions or otherwise provide feedback (e.g., by posting opinions or reactions) on a particular piece of content, the crowd sourcer 230 emphasizes portions of content to the users 110. This permits users to quickly and easily skim through the important parts of a particular piece of content, with the important parts of the content being determined by other users 110.

The exemplary opinion 630 illustrated in FIG. 8 includes an emphasized text portion 850 that includes bolded text. The emphasized text portion 850 has been emphasized in response feedback from the users 110. For example, the crowd sourcer 230 may determine that the text 850 in the opinion 630 should be emphasized in response to one or more users posting a highlighted opinion for the particular portion of text, or in response to other feedback provided by users which is applicable to the text (e.g., if the text was the subject of an opinion or reaction). In certain embodiments, the crowd sourcer 230 may require a threshold level of user feedback before emphasizing a portion of text. For example, the crowd sourcer 230 may only emphasize a portion of text if at least five highlighted opinions have been posted for the text, or if the text has been the subject of user feedback at least five times.

The crowd sourcer 230 may emphasize portions of text in any type of content, including but not limited content in articles, opinions and reactions. Furtthermore, in addition to bolding the text, other types of emphasizing may be utilized by the crowd sourcer 230. For example, in other embodiments, the crowd sourcer 230 may italicize, underline, alter the font style, and/or alter the size of the text to emphasize the text. Additional types of emphasis may be utilized as well.

It is pointed out that a number of different features are located beneath the exemplary opinion 630 illustrated in FIG. 8, including a bias widget 450, following options 430, a promotion indicator 830 and promotion details 840. The promotion indicator 830 permits a user to "promote" a particular piece of content (e.g., article, opinion, reaction, highlighted opinion, etc.) in a similar fashion to the "Like" feature on Facebook™. For example, if a user wishes to expressly indicate that he or she likes or favors a particular piece of content, the user may click on or otherwise select the promotion indicator 830.

The promotion details 840 indicate how many users have promoted the piece of content. The promotion details 840 may also identify the users or connections that have promoted the article (e.g., John Smith).

The bias widget 450 is also included beneath the opinion 630. A similar bias widget 450 is also included for the exemplary article 125 illustrated in FIG. 4. The bias widget 450 represents a visual indicator that displays the bias of a particular piece of content (e.g., article, opinion, reaction, etc.) on the news reader system 150. For example, if an article 125 is provided on a political topic, the bias widget 450 may indicate how far left or how far right the article's stance is on a political spectrum.

To determine the bias of a particular piece of content, the biaser 245 may be configured to analyze the characteristics of the content. For example, the biaser 245 may analyze text of the content for particular words or phrases, or may analyze multimedia items associated with the content. Determining the bias 245 of content may also involve considering the source 160 of the content (e.g., CNN™ tends to be biased towards the democratic party), analyzing metadata that is associated with the content, or analyzing user input associated with the content (e.g., the number of users that indicate the article is biased in a particular manner or by analyzing reactions posted about the content). Other characteristics may also be considered in determining the bias of a piece of content. In certain embodiments, a human user may be utilized to determine the bias of content.

Regardless of which characteristics are actually utilized to determine the bias, the biaser 245 determines the bias of the content and outputs an indicator via bias widget 450 that identifies the bias of the content. The visual indicator that is output by the bias widget 450 may vary. For example, in the case of a politically-related article, the bias widget may indicate two options: a bias towards the "Democratic Party" or a bias towards the "Republican Party". In other embodiments, the bias of an article 125 or other piece of content may be displayed on a sliding scale (e.g., indicating a number from one to ten) to indicate how far left or right the content is biased. Other types of visual indicators may also be utilized to display the bias of the article 125.

In addition to displaying the bias widget 450, the biaser 450 may also be configured to present articles 125 to users based on a particular bias preference of the user 110. For example, a user may wish to receive articles with a particular bias (e.g., sports articles that are pro-New York Yankees™ or political articles that are pro-Republican). Each time an article is received by the news reader system 150 that is consistent with the bias preference of the user 110, the article may be presented to the user (e.g., in the following feed 340 or under a topic category 325).

Figure 9:
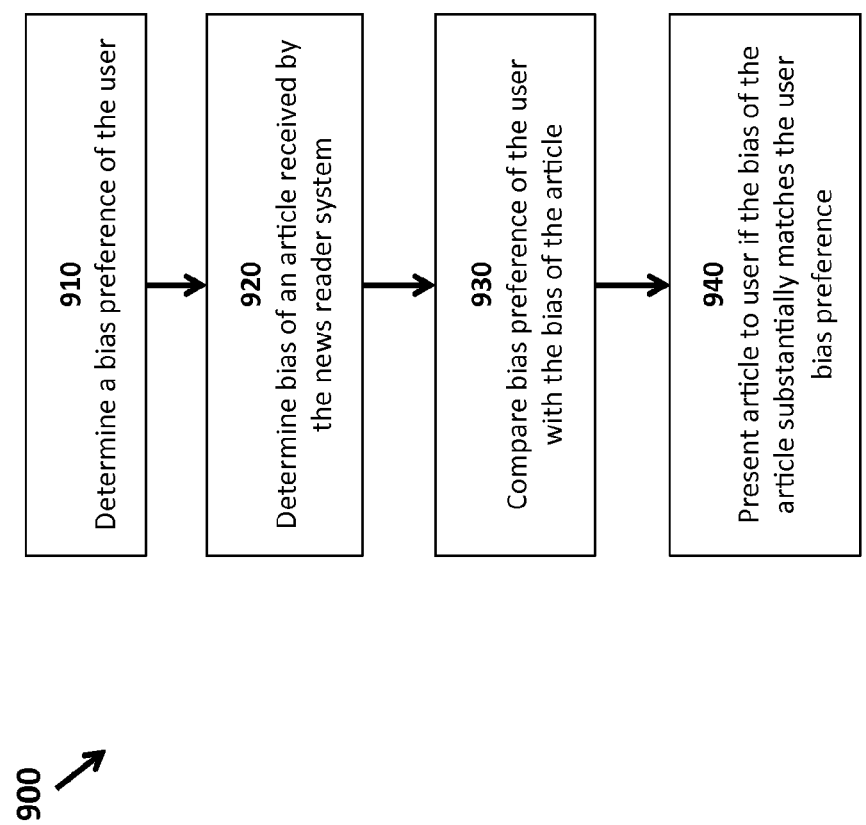
FIG. 9 is a method for presenting articles to a user based on a bias preference of the user in accordance with one embodiment of the present principles.

FIG. 9 illustrates an exemplary method 900 for presenting articles 125 to users based on a bias preference of the user 110. The method 900 begins by determining a bias preference for a user 110 (block 910). A user's bias preference indicates the user's inclination toward receiving articles with a particular bias or particular viewpoint. For example, the user's bias preference may indicate whether the user is pro-Democratic or pro-Republican, or may represent a bias towards or against a particular sports team.

The manner in which a user's bias preference is determined may vary. In one embodiment, the user 110 explicitly indicates his or her bias preference. For example, the user may explicitly indicate a preference for receiving pro-Republican articles. In other embodiments, the bias preference of a user 110 is determined by analyzing content (e.g., opinions, articles, reactions, etc.) posted by the user on the news reader system 150. As explained above, this may involve analyzing various characteristics of the content (e.g., analyzing the text for particular words or phrases, or analyzing the metadata associated with the content).

Next, the bias of the article 125 is determined (block 920). The bias of the article 125 may be determined in different ways. In one embodiment, the news provider 160 or other source of the article directly specifies the bias of the article 125 or the bias of the article is specified in metadata associated with the article 125. In other embodiments, the characteristics of the article 125 are analyzed to determine the bias of the article 125 as explained above.

After the user's bias preference and the bias of the article is ascertained, the user's bias preference is compared with the determined bias of the article 125 (block 930). If the bias of the article 125 matches (or is within a particular range of acceptance) the user's bias preference, then the article 125 is presented to the user 125 (block 940). In certain embodiments, the article 125 may be presented under a topic category 325 associated with the article 125 or in the user's following feed 340.

Having described various features of the news reader system 150 (e.g., the features relating to timelines, reactions, opinions and following), details are now provided to explain how the social network integrator 260 may utilize these features to interact with social networks (e.g., Facebook™, Twitter™ or LinkdIn™) and provide a further sense of community among the users 110 of a news reader system 150. As illustrated in FIG. 2, the social network integrator 260 includes various functions or modules that provide for various interactions with social networks.

The content crawler 261 is configured to analyze the content associated with a user's connections on one or more social networks and identify articles 125 that are being shared or posted by the user's connections. The identified articles 125 may then be retrieved by the content crawler 261 and associated with the appropriate supergroup or subgroup (e.g., possibly via cooperation with the article classifier 215).

The social networking connections of a user may vary depending upon the social network being analyzed. For example, a user's connections may represent the user's "Friends" on Facebook™, or may represent people who are following or being followed by the user on Twitter™.

After identifying a user's connections on one or more social networks, the content crawler 261 analyzes the content associated with the connections to identify articles 125 that are being shared, posted, or discussed by the connections on the social network. For example, this may include analyzing a user's wall, timeline or news feed on Facebook™ to detect articles 125 that are the subject of discussion. Similarly, on Twitter™ this may include analyzing tweets posted by people that the user is following or being followed by to detect the same.

Any of the articles 125 detected by the content crawler 261 may be retrieved and stored in a database 210. The retrieved articles 125 may be then be classified into supergroups and subgroups as discussed above. In this manner, the content crawler 261 may identify articles 125 that are the subject of discussion on a social network, and may supplement a collection of content on the news reader system 150 with this additional content.

In some embodiments, the articles 125 retrieved from social networks may be displayed to a user 110 via an interface provided by the news reader system 150. The exemplary interface 300 disclosed in FIG. 3 includes a "Shared by Friends" category 330 that is configured to display all articles that have been retrieved from the social networking connections of the user 110. Thus, the user 110 can view all of the articles 125 that are being shared or discussed by the user's social networking connections.

The social integrator 260 also includes an inviter 262 that is configured to send an invitation to join the news reader system 150 to one or more of the user's connections on a social network. For example, the user post an invitation on the wall of a user on Facebook™ or may post a tweet on Twitter™ which includes an invitation. The invitation may include a hyperlink to a website associated with the news reader system 150 that permits the user's connections to sign up and become a member of the news reader system 150.

The content publisher 263 is configured to post certain content (e.g., articles, opinions, reactions, or highlighted opinions posted by the user 110) provided by a user 110 on one or more social networks. For example, when a user 110 posts content on the news reader system 150, the content publisher 263 may propagate all or a portion of the content to be published on a social network.

As explained above, the interface 600 in FIG. 6 discloses an opinion publishing form 610 that permits a user to post opinions on the news reader system 150 and a reaction publishing form 620 that permits a user to post reactions on the news reader system 150. Both of the forms 610 and 620 include a set of post options 611. The post options 611 may represent buttons or input fields (e.g., checkboxes or radio buttons) that permit a user to specify social networks that the user 110 would like to publish the associated opinion 630 or reaction 640.

For example, in one embodiment, the post options 611 on the opinion publishing form 620 may permit to specify an opinion 630 is to be posted on Facebook™ and Twitter™ in addition to being posted on the news reader system 150. The post options 611 may also permit the user 110 to specify the manner in which the opinion is published on a social network. For example, the post options 611 permit a user to specify that only the input from the option title field 613 is to be posted as a tweet on Twitter™ as a tweet, and that the input from the option body field 614 is to be posted on the user's Facebook™ wall.

It should be recognized that the content publisher 263 is not limited to posting opinions 630 and reactions 640 on social networks. Rather, the content publisher 263 may be configured to post or publish any type of content (e.g., highlighted opinions or articles) provided by the user 110 on one or more social networks.

In certain embodiments, the social network integrator 260 also includes a page builder 264. The page builder 264 is configured to generate webpages or profiles to be displayed on social networks with content associated with the news reader system 150. For example, in one embodiment, the page builder 264 may be configured to generate a webpage or profile on Facebook™ for a particular topic or event associated with a supergroup or subgroup. The page created on Facebook™ or other social network may be presented in a format similar to Facebook™ Timeline format in which content is presented in chronological order.

To further illustrate the role of the page builder 264, consider an exemplary scenario in which the page builder 264 is adding a Facebook™ page relating to the "Arab Spring". The page being created may be populated with content from a particular supergroup or subgroup associated with the Arab Spring. For example, the page may display all of the articles 125 that the article classifier 215 has associated with a supergroup or subgroup associated with Arab Spring. The page may also display other content (e.g., opinions, reactions, etc.) associated with the topic. The Facebook™ page associated with the Arab Spring may be presented in the Facebook™ Timeline format so that a person viewing the page would be presented with content (e.g., text, images, articles, etc.) related to the Arab Spring in a chronological timeline format.

As additional content related to the topic of the Arab Spring is published over time, the page builder 264 may update the page on the social networking site to include this additional information.

The activities performed by the social network integrator 260 may appear on the profile of a user, in addition to various over types of information. The manner in which a user's profile is generated and displayed is controlled by the profile presenter 225.

The profile presenter 225 may be configured to permit a user 110 of the news reader system 150 to create, edit and present a user profile. In certain embodiments, each user 110 establishes a public profile and a private profile. The profile presenter 225 is configured to assist a user in performing various types of functions related to maintaining the public and private profiles (e.g., adding content to the profiles, customizing the profiles, or deleting the profiles).

The public profile may represent a webpage that can be viewed by the general public or by registered users of the news reader system 150. The public profile may disclose personal information for a particular user 110 (e.g., name, contact information, picture, email address, etc.). The user's 110 public profile may also provide a listing of the articles 125 that were viewed by the user 110 (i.e., the users browsing history), the opinions and reactions posted by a user 110, and links or scrollable panes (e.g., as described herein with respect to the article scroller 255) for presenting the articles, opinions and reactions.

To further facilitate a sense of community among the users 110 of the news reader system 150, the public profile may disclose a variety of different user activity indicators, social indicators, and related links. For example, the public profile may include:

(1) Opinions Posted: the number of times a user posted an opinion on a particular topic or article. Hyperlinks or scrollable panes may also be provided to view the one or more opinions or articles.

(2) Reactions: the number of times a user posted a reaction. Hyperlinks or scrollable panes may also be provided to one or more of the reactions posted.

(3) Followers: the number of users that are following the user associated with the public profile. A list of the followers may also be provided with links to the profiles for each following user.

(4) Following: the number of users, topics, authors, sources, etc. that the user is following. A list of hyperlinks or scrollable panes may be provided to each user, topic, author, source, etc. that the user is following.

(5) Connections: the number of following connections for the particular user. A list of the users associated with the following connection may also be provided with links to the profiles for each following user.

(6) Highlighted Opinions: the number of highlighted opinions posted by the particular user. A listing of the highlighted opinions may be displayed, along with the user preference selected by the user.

(7) User Ranking: a score or indicator assigned to a user reflecting the extent of the user's involvement or interaction with the website. Computation of the user ranking may involve a variety of different variables. For example, the score may consider the extent that a user contributes content (e.g., the number and frequency at which a user posts opinions or reactions), and extent of the user's social activities (e.g., the number of connections or followers for a particular user). Other related factors may also be considered.

(8) Promoted Content: articles, opinions, reactions or other content that the user has promoted.

The profile presenter 225 may also be configured to present a private profile to a user 110. The user's 110 private profile page is only accessible to the user 110 after logging into his or her account on the news reader system 110. The private profile is not accessible to the general public or other users 110. The private profile page provides a user 110 with editing functionalities. For example, the private profile may permit a user 110 to edit (e.g., add, delete, reorder, etc.) the contact information, or content (e.g., articles 125, opinions, or reactions) presented on the user's public profile. The private profile may also permit the user 110 to track his or her previous viewing history.

While there have been shown, described and pointed out fundamental novel features of the present principles, it will be understood that various omissions, substitutions and changes in the form and details of the methods described and devices illustrated, and in their operation, may be made by those skilled in the art without departing from the spirit of the same. For example, it is expressly intended that all combinations of those elements and/or method steps which perform substantially the same function in substantially the same way to achieve the same results are within the scope of the present principles. Moreover, it should be recognized that structures and/or elements and/or method steps shown and/or described in connection with any disclosed form or implementation of the present principles may be incorporated in any other disclosed, described or suggested form or implementation as a general matter of design choice. It is the intention, therefore, to be limited only as indicated by the scope of the claims appended hereto.

What is claimed is:

1. A method for presenting articles to a user on a news reader system, the method comprising:
   creating a profile for the user;
   receiving an article from a news provider, wherein the article is stored on a non-transitory computer readable storage medium;
   analyzing, with a processor, characteristics associated with the article;
   designating with a processor, a primary article based on the characteristics associated with the article;
   comparing the characteristics of the article with a second set of characteristics associated with a second article that is currently designated as the primary article;
   determining whether the article is more optimal for presentation than the second article based on said comparison;
   designating the article as the primary article if it is determined that the article is more optimal for presentation than the second article;
   presenting the article to the user for review;
   receiving an input from the user to highlighting a portion of the article, wherein highlighting the portion of the article comprises selecting the portion of the article with a cursor or touch screen device;
   in response to highlighting the portion of the article, displaying a menu of selectable options;
   receiving a second input from the user associated with choosing one of the selectable options;
   associating the selected portion of the article with the profile created for the user; and
   in response to a request to view the user's profile, displaying the selected portion of the article along with other content associated with the user's interaction with the news reader system.

2. The method as recited in claim 1, wherein the primary article represents an article that is determined to be the optimal article for presentation to the user on a particular topic.

3. The method as recited in claim 1, further comprising:
   determining whether the article is breaking based on the characteristics of the article; and
   designating the article as a primary article if the article is breaking.

4. The method as recited in claim 1, wherein analyzing the characteristics of the article includes determining whether the article includes multimedia items that support a description associated with the article.

5. The method as recited in claim 1, wherein the method further comprises:
   establishing a following connection between the user and a second user that has created an account associated with the news reader system; and
   displaying the selected portion of the article to the second user in response to the second user accessing the profile created for the user.

6. The method as recited in claim 1, wherein the method further comprises:
   receiving a third input from the user that indicates the user's opinion regarding the selected portion of the article;
   displaying the third input indicating the user's opinion when the profile for the user is displayed.

7. The method as recited in claim 1, wherein the method further comprises:
   receiving a request to view the article from a second user; and
   emphasizing the selected portion of the article that was highlighted by the user when the article is displayed to the second user.

8. The method as recited in claim 1, wherein the selected portion of the article that was highlighted by the user is a textual portion of the article.

9. The method as recited in claim 1, wherein the selected portion of the article that was highlighted by the user is a multimedia item included in the article.

10. A system for presenting articles to a user on a news reader system, the system comprising:
    a computing device having a processor and a non-transitory physical memory, the physical memory storing instructions that cause the processor to:
    create a profile for the user;
    receive an article from a news provider;
    analyze characteristics associated with the article; and
    designate the article a primary article based on the characteristics associated with the article;
    compare the characteristics of the article with a second set of characteristics associated with a second article that is currently designated as the primary article;
    determine whether the article is more optimal for presentation than the second article based on said comparison;
    designate the article as the primary article if it is determined that the article is more optimal for presentation than the second article;
    display the article to the user for review;
    receive an input from the user to highlight a portion of the article, wherein highlighting the portion of the article comprises selecting the potion of the article with a cursor or touch screen device;

in response to highlighting the portion of the article, display a menu of selectable options;

receive a second input from the user associated with choosing one of the selectable options;

associate the selected portion of the article with the profile created for the user; and in response to a request to view the user's profile, display the selected portion of the article along with other content associated with the user's interaction with the news reader system.

11. The system as recited in claim 10, wherein the primary article represents an article that is determined to be the optimal article for presentation to the user on a particular topic.

12. The system as recited in claim 10, wherein the news server is further configured to:

determine whether the article is breaking based on the characteristics of the article; and designate the article as a primary article if the article is breaking.

13. The system as recited in claim 10, wherein the news server is configured to determine whether the article includes multimedia items that support a description associated with the article in analyzing the characteristics of the article.

14. A non-transitory computer readable storage medium comprising a computer readable program for presenting an article to a user, wherein the computer readable program when executed on a computer causes the computer to:

create a profile for the user;

accept an article from a news provider;

identify characteristics associated with the article;

determine whether the article is to be designated a primary article based on the characteristics associated with the article;

compare the characteristics of the article with a second set of characteristics associated with a second article that is currently designated as the primary article;

determine whether the article is more optimal for presentation than the second article based on said comparison;

designate the article as the primary article if it is determined that the article is more optimal for presentation than the second article;

present the article to the user for review;

receive an input from the user to highlight portion of the article, wherein highlighting the portion of the article comprises selecting the potion of the article with a cursor or touch screen device;

in response to highlighting the portion of the article, display a menu of selectable options;

receive a second input from the user associated with choosing one of the selectable options; and associate the selected portion of the article with the profile created for the user;

in response to a request to view the user's profile, display the selected portion of the article along with other content associated with the user's interaction with the news reader system.

15. The computer readable storage medium as recited in claim 14, wherein the primary article represents an article that is determined to be the optimal article for presentation to the user on a particular topic.

16. The computer readable storage medium as recited in claim 14, wherein the computer readable program further causes the computer to present the article to the user on an interface associated with a news reader system if the article is designated as a primary article.

17. The computer readable storage medium as recited in claim 14, wherein the computer readable program further causes the computer to:

determine whether the article is breaking based on the characteristics of the article; and designate the article as a primary article if the article is breaking.

* * * * *